Feb. 24, 1925.
J. N. HOPE ET AL
NUT LOCK
Filed Nov. 11, 1922
1,527,552
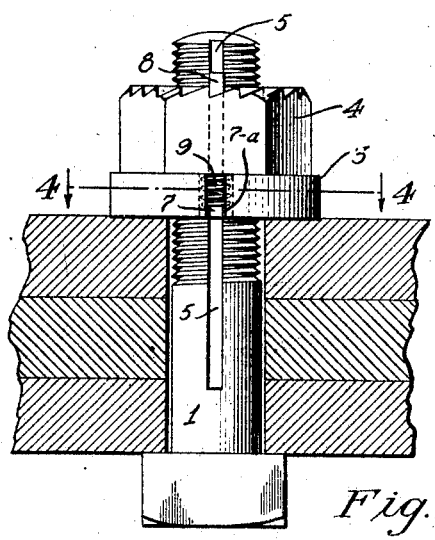
Fig.1.
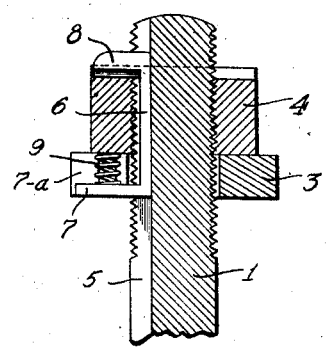
Fig.2.
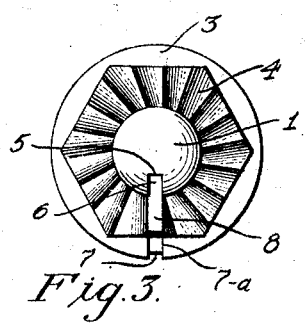
Fig.3.
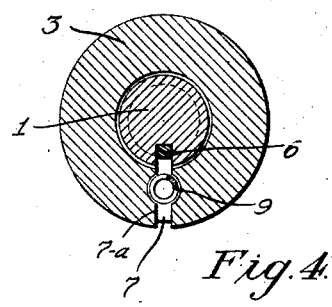
Fig.4.
Fig.6.
Inventors
J. N. Hope and
J. H. Byrnes.
By Edson Bros.
Attorneys Patented Feb. 24, 1925.

1,527,552

UNITED STATES PATENT OFFICE.

JOSEPH N. HOPE AND JAMES H. BYRNES, OF LAWRENCE, MASSACHUSETTS.

NUT LOCK.

Application filed November 11, 1922. Serial No. 600,439.

*To all whom it may concern:*

Be it known that we, JOSEPH N. HOPE and JAMES H. BYRNES, citizens of the United States, residing at Lawrence, in the county of Essex and State of Massachusetts, have invented certain new and useful Improvements in Nut Locks, of which the following is a specification.

This invention relates to improvements in what are generaly termed nut-locks for bolts, although the invention is capable of use for locking nuts or other objects in any other effective relations.

The invention has for its object to provide for effectively securing the nut upon its bolt against inadvertent or accidental displacement under a jarring action, as bolts are subjected to especially where used as a fastening on railroads, bridges, and like structures, and which invention or fastening is not liable to be incidentally or clandestinely disconnected from the object or railroad rail to which it may be applied and the nut from the bolt and whereby the nut is adapted to be automatically locked upon the bolt as it is screwed to its final position.

Other objects of the invention will be apparent as the description of the construction and operation thereof proceeds as will appear from the following specification and accompanying illustration.

The invention therefore consists of certain instrumentalities and features of construction substantially as hereinafter more fully set forth and defined by the appended claims.

The accompanying drawing illustrates the preferred embodiment of our invention, or one form thereof, wherein it will be understood that various changes and modifications as to the detailed construction and arrangement of parts may be made without departing from the spirit or scope of the invention as covered by the claim, and in which drawing—

Figure 1 is a side elevation of our invention.

Fig. 2 is a longitudinal section of Figure 1 taken on a line exposing more particularly the leading features thereof.

Fig. 3 is a plan view of the invention.

Fig. 4 is a transverse section of the same.

As characteristic features of our invention, we provide a bolt designated as 1, of the usual type for joining or splicing railroad sections or, as for that matter, for general heavy building purposes, as in building railroad bridges, bridge-trusses, and like structures. Said bolt 1 has applied thereto a split or slotted annulus or washer-like member 3, although loosely or slightly spaced off therefrom, designated to rest in contact with the nut 4 with which the bolt is to be equipped, to which mention will be further made presently. The bolt 1 in addition to having the usual head, has a longitudinal slot 5 mutilating its thread and extending clear through the outer end of said bolt. Said slot or way is adapted to receive a combined key or spline or pawl 6, or rather the longitudinal portion thereof, said key or pawl having lateral terminals 7 and 8, the inner terminal being adapted to be received within the slot or split of the washer-like member or annulus as at 7ª, and superposed upon a preferably helical (or other) spring 9 suitably secured or positioned in the split or slot 7ª to provide for exerting outward pressure or thrust upon the key or pawl 6, the purpose of which will made apparent later. The face of the nut 4 is suitably notched, serrated or otherwise adapted to serve as a ratchet, and the pawl-forming terminal 8 of the key is adapted to be automatically and forcibly held in lock-engagement with the ratchet face of the nut when the nut has been screwed inwardly jamb-tight against the washer-like member 3, the nut then having engaged and forced the terminal of the pawl 6 clear into the slot 7ª of said member 3, tightly compressing the spring 9, the reaction thereof bringing the pawl forcibly into engagement with the ratchet-faced nut, effectively locking the pawl 6 to the nut 4 against being inadvertently displaced under a jarring or other casual force, or liability of surreptitious removal.

From the foregoing description of the construction and operation of our invention, it is considered that the application thereof for use, advantages and effectiveness for its purpose will be appreciated.

Having thus described our invention what we claim and desire to secure by Letters Patent is:

In a device of the character described, the combination with a bolt having a longitudinal slot, of a nut having one of its faces notched, a key arranged within the longitudinal slot of the bolt, said key having lateral terminals, one of which is adapted to engage the notches in the nut, a washer adapted to be arranged at the end of the nut remote from the notched face, said washer being provided with a radially extending slot, adapted to have the other lateral terminal of the key arranged entirely therein, said slot being provided with an enlarged portion, and a coil spring arranged in said enlarged portion of the slot and entirely received in said slot, said spring having one of its ends engaging the face of the nut and the other of its ends engaging the lateral terminal of the key arranged within the slot.

In testimony whereof we affix our signatures.

JOSEPH N. HOPE.
JAMES H. BYRNES.